United States Patent [19]

Hearn

[11] 4,443,702
[45] Apr. 17, 1984

[54] HAND OPERATED LEVEL DETECTOR

[75] Inventor: Daniel P. Hearn, Richardson, Tex.

[73] Assignee: Atlantic Richfield Company, Los Angeles, Calif.

[21] Appl. No.: 322,781

[22] Filed: Nov. 19, 1981

[51] Int. Cl.³ ............................................. G01F 23/00
[52] U.S. Cl. .................................... 250/357.1; 378/52
[58] Field of Search ................ 250/357.1; 378/52, 198

[56] References Cited

U.S. PATENT DOCUMENTS 3,697,754 10/1972 Maxwell ................................. 378/52
3,716,711 2/1973 Olesen ............................... 250/357.1

Primary Examiner—Bruce C. Anderson
Attorney, Agent, or Firm—M. David Folzenlogen

[57] ABSTRACT

A hand-held, caliper-like detector suitable for measuring the level of a nongaseous substance in a cylinder has two extending arms. The arms of the caliper-like detector are adapted to extend around a part of the cylinder. A gamma radiation source is located on one arm and is adapted to emit gamma rays through a segment of the cylinder toward a scintillator. The scintillator is located on the second arm and is adapted to receive the gamma rays emitted by the radiation source. Various embodiments of the detector pertain to positioning of the radiation source, shielding the source when not in use, the angle subtended by an imaginery chord joining the source and scintillator, and fabrication of source and scintillator housing.

1 Claim, 5 Drawing Figures

HAND OPERATED LEVEL DETECTOR

BACKGROUND OF THE INVENTION

This invention relates to determining the level of a nongaseous substance in a chamber. More particularly, this disclosure pertains to a hand-held, two-arm, caliper-like portable level detector having a gamma radiation source on one arm and a scintillator on the other arm.

There are many times when it is desirable to measure the level of a liquid in a cylinder, for example, the level of the fire extinguishing liquid Halon. The measurement should be made without disrupting service lines to the chamber and without opening the chamber. It is also desirable that the measuring system be suited for use on cylinders of different sizes. Neutron and gamma ray backscatter gauges have been developed which require only one access surface on the wall of the container; but these backscatter gauges do not provide satisfactory contrast between some liquids and their surroundings.

SUMMARY OF THE INVENTION

A hand-held, two-arm, caliper-like detector for the level of a nongaseous substance in a cylinder is provided. The detector is comprised of a radioactive source and scintillator which are mounted on the two arms in fixed or adjustable spaced apart relation to each other.

DETAILED DESCRIPTION OF THE PREFERRED EMBODIMENTS

Several variations of a portable, hand-held, two-arm, caliper-like level detecting device are hereinafter described. The level detecting device is especially useful for accurately measuring the level of a fire extinguishing liquid in a bank of cylinders without disturbing the cylinders.

Figure 1:
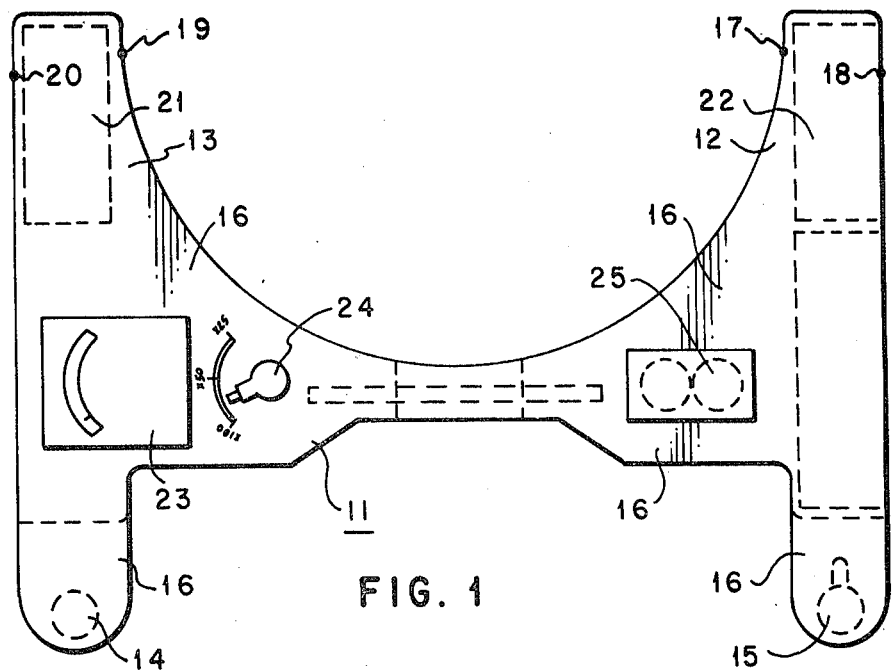
FIG. 1 is a pictorial top view of a level detecting apparatus.
Figure 2:
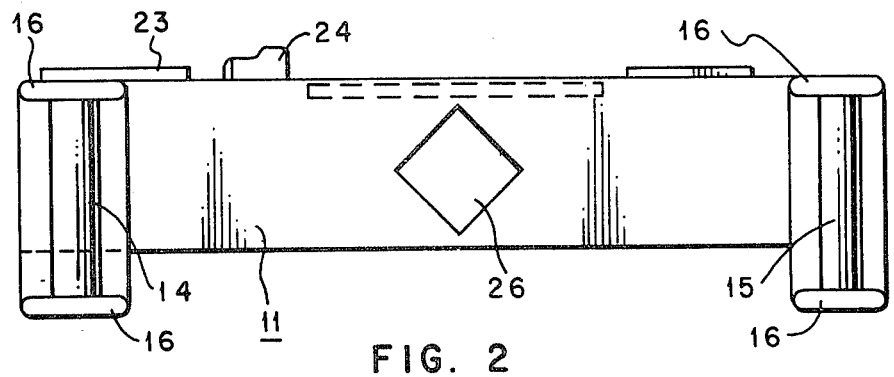
FIG. 2 is a pictorial end view of the level detecting apparatus of FIG. 1.

As shown in FIGS. 1 and 2, level measuring device 11 has first extension 12 and second extension 13. The measuring device is adapted to be hand-held by handles 14 and 15 which are connected to housing 16. Extensions 12 and 13 have length, width and thickness. Extension 12 has inner surface 17 and outer surface 18 and extension 13 has inner surface 19 and outer surface 20. Extensions 12 and 13 extend in the same direction from the hand-held portion of the measuring device with inner surface 17 of extension 12 facing inner surface 19 of extension 13. The spacing between the two inner surfaces is preselected to fit the desired use of the measuring device and this spacing may be made adjustable if so desired. The measuring device illustrated is for measuring the level of a liquid in a cylinder; but the device may be adapted to any chamber configuration. In similar fashion, the width of caliper-like arms 12 and 13 may be controlled to permit insertion in the space between cylinders or chambers placed in a row in a bracket.

Second extension 13 has radioactive source 21 which emits gamma rays toward inner surface 17 where scintillator 22 is mounted or located on first extension 12. The radioactive source is any sort of radioactive signal generator that emits a beam of radioactive energy whose photons or particles are absorbed or scattered, and thereby attenuated, by the presence of liquid or solid substances. A common safe source of radioactivity is a 50 microcurie radium 226 or cesium 137 source. Preferrably, the source is lead or tantalum shielded on all sides except for a hole to collimate a beam of gamma ray particles. Scintillator 22 is any sort of detector material that produces a light pulse when the detector material is struck by the signal emitted by radioactive source 21, for example, a sodium iodide crystal is a common scintillation detector for the gamma rays emitted by radium 226 or cesium 137. The radioactive source and scintillator are oriented in a way that the signal emitted by radioactive source 21 passes through at least a portion of a chamber (not shown) placed between caliper-like arms 12 and 13 and thereafter contacts the responsive detector material. In a typical fashion, the scintillator part of the level detector is adapted in the usual way to trigger a photomultiplier tube which in turn produced a pulse rate which corresponds to the rate at which radiation photons or particles are received by the scintillation material. This pulse rate signal is fed to count rate meter 23. The sensitivity of the meter may be adjusted by range switch 24.

For total portability and explosion proofing, level detector 11 may be equipped with batteries 25. If explosion proofing is not required, a separate battery pack or power source may be used and an audio circuit added to emit frequencies related to count rates and a recorder jack added. If explosion proofing is desirable, all electrical assemblies may be integrated into potted nonrepairable units and all unsealed devices and circuits, such as meter, batteries, and poteniometers housed in an explosion proof housing.

Figure 3:
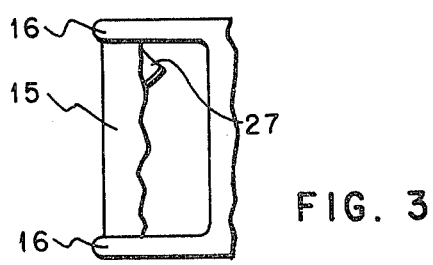
FIG. 3 is a fragmented partial pictorial side view of the handle portion of the apparatus of FIG. 2.

Level detecting device 11 may also be equipped with sighting or marking hole 26 through which the precise level of the liquid or solids in the chamber may be marked or read. In addition, if desired, the radioactive source may be equipped with a shutter activated by trigger 27 shown in FIG. 3. A trigger activated shield will not be necessary if the level detecting device is stored in a locked portable shielded storage container (not shown) and is removed from the container only when a measurement or reading is to be taken.

Figure 4:
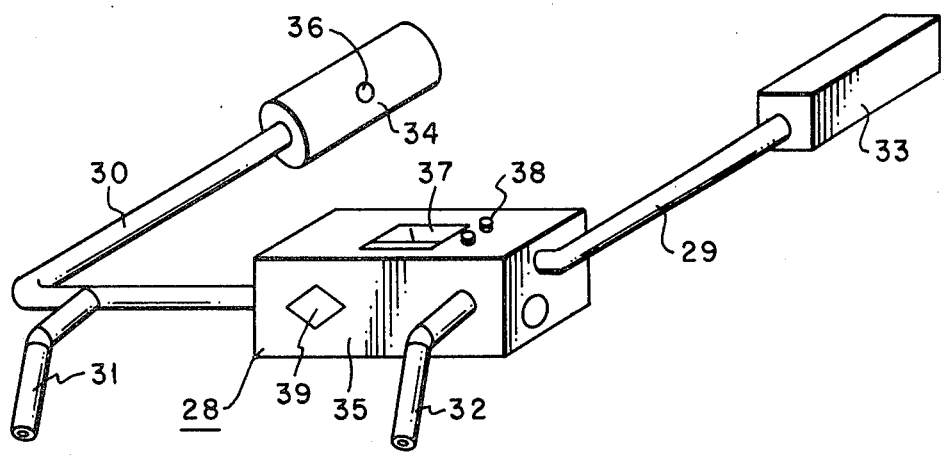
FIG. 4 is an isometric pictorial side view of a second embodiment of a hand-held level detecting apparatus.
Figure 5:
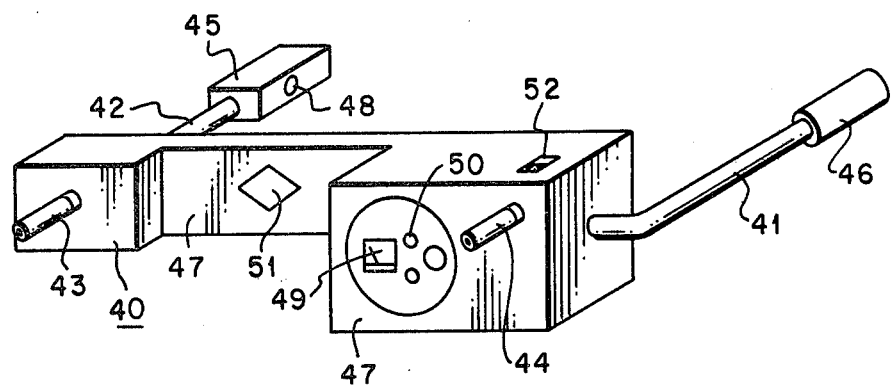
FIG. 5 is an isometric pictorial side view of a third embodiment of a hand-held level detecting apparatus.

Other variations in level detecting device 11 are shown in FIGS. 4 and 5.

As shown in FIG. 4, level measuring device 28 has first extension 29 and second extension 30. The measuring device is adapted to be hand-held by handles 31 and 32 which are placed at an angle to the longitudinal axis of extensions 29 and 30 to facilitate lifting and holding the level detecting device. The handles are connected either to the housing or to an extension of the device. Near the outer end of extension 29 is radioactive source 33 and near the outer end of extension 30 is scintillator 34. The active sides of the source and scintillator face each other. Extensions 29 and 30 extend in the same direction from the hand-held portion of the measuring device and are affixed to housing 35 in a way that maintains the orientation of the radioactive source and scintillation material. For example, the end of the extensions may be keyed, or made square, D-shaped or the like. The spacing between the two extensions is preselected to fit the desired use of the measuring device and this spacing may be made adjustable if so desired. For example, either or both extensions may be indented to lock at different points. The measuring device illustrated is for measuring the level of a liquid in a cylinder; but the device may be adapted to any chamber configuration. In similar fashion, the width of the source and scintillator may be controlled to permit insertion in the space between cylinders or chambers.

The radioactive source and scintillator are oriented in a way that the signal emitted by radioactive source 33 passes through at least a portion of a chamber (not shown) placed between caliper-like arms 29 and 30 and thereafter contacts the responsive detector material of the scintillator through opening 36. As previously mentioned, in a typical fashion the scintillator part of the level detector is adapted to produce a pulse rate signal which corresponds to the rate at which radiation photons or particles are received by the scintillation material. This pulse rate signal is fed to count rate meter 37. The sensitivity of the meter may be adjusted by potentiometer 38. Level measuring device 35 may also be equipped with sighting or marking hole 39 which lies in the same plane as the active portions of the radioactive source and scintillator and through which the precise level of the liquid or solids in the chamber may be marked, or read if the cylinder or chamber is calibrated.

As shown in FIG. 5, level measuring device 40 has first extension 41 and second extension 42. The measuring device is adapted to be hand-held by handles 43 and 44 which, as shown, are aligned with the longitudinal axis of extensions 41 and 42 to facilitate lifting and holding the level detecting device. The handles are connected to the housing of the device. Near the outer end of extension 42 is radioactive source 45 and near the outer end of extension 41 is scintillator 46. The active sides of the source and scintillator face each other. Extensions 41 and 42 extend in the same direction from the hand-held portion of the measuring device and are affixed to housing 47 in a way that maintains the orientation of the radioactive source and scintillation material. For example, the end of the extensions may be keyed, or made square, D-shaped or the like. The spacing between the two extensions is preselected to fit the desired use of the measuring device and this spacing may be made adjustable if so desired. For example, either or both extensions may be indented to lock at different points. The measuring device illustrated is for measuring the level of a liquid in a cylinder; but the device may be adapted to any chamber configuration. In similar fashion, the width of the source and scintillator may be controlled to permit insertion in the space between cylinders or chambers.

The radioactive source and scintillator are oriented in a way that the signal emitted by radioactive source 45 passes through aperture 48 and then through at least a portion of a chamber (not shown) placed between caliper-like arms 41 and 42 and thereafter contacts the responsive detector material of scintillator 46. The pulse rate signal produced by the scintillator part of the level detector is fed to count rate meter 49. The sensitivity of the meter may be adjusted by potentiometer 50. Level measuring device 40 may also be equipped with sighting or marking hole 51 through which the precise level of the liquid or solids in the chamber may be marked, or read if the cylinder or chamber is calibrated. For illustrative purposes, on-off switch 52 is shown. If the measuring device is made explosion-proof, this switch may move a magnet which in turn causes a sealed reed switch to move. If necessary, the device may also be equipped with a level gauge to keep the source and scintillator in the same horizontal plane.

In operation, the level detecting device is unlocked from its shielded container and the radioactive source and scintillator are placed on opposite sides of a chamber in horizontal alignment with each other. The radioactive source emits gamma rays which readily penetrate the walls of the chamber, but which are attentuated, absorbed or scattered by a liquid or solid substance inside the chamber. The source and scintillator are moved up and down the chamber until an abrupt decrease or increase in the detected counts/time shown by the meter indicates interception of the gamma ray beam by the top of the attentuating material inside the chamber. The level is noted and/or marked. In practice, measurements across a sector of the chamber as small as 90° are easily made. In general, the angle subtended by an imaginery chord joining the source and scintillator will provide a gas to liquid (or solid) count rate contrast ratio of 2:1 minimum assuming normal background radiation levels.

Reasonable variations and modifications are practical within the scope of this disclosure without departing from the spirit and scope of the claimed invention.

The embodiments of the invention in which an exclusive property or privilege is claimed are defined as follows:

1. An apparatus for detecting the level of a nongaseous substance in a cylinder comprising a measuring means having a portion adapted to be held by hand, said means having at least first and second extensions spaced apart from each other, each of said extensions having length, width, thickness and inner and outer surfaces, said first and said second extensions extending in the same direction from said hand-held portion of said measuring means with the inner surfaces of said extensions facing each other, a gamma radioactive source means located on said first extension, a scintillator means for gamma radiation detection located on said second extension, said source means adapted to emit a signal of gamma ray energy which is attenuated by the presence of nongaseous substances and adapted to emit said gamma ray signal toward said scintillator means, and said scintillator means being adapted to receive said radiation signal emitted by said source means and adapted to produce a pulse rate signal correlating to the rate at which gamma ray particles are received by said scintillator means.

* * * * *